Sept. 30, 1930.   J. W. HASSELKUS ET AL   1,777,262

OBJECTIVE SUITABLE FOR PHOTOGRAPHIC PURPOSES

Filed June 28, 1928

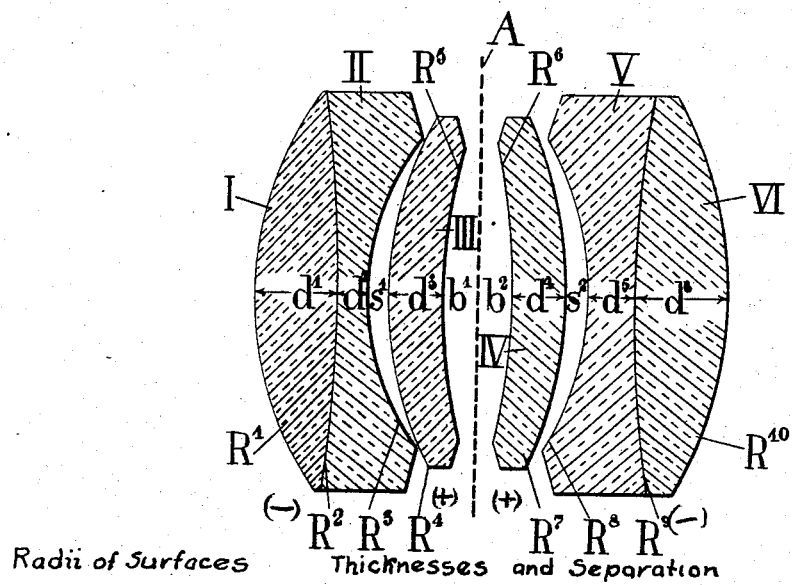

Radii of Surfaces $R_1 = +22.66$
$R_2 = -95.51$
$R_3 = +16.73$
$R_4 = +24.25$
$R_5 = +33.77$
$R_6 = -43.64$
$R_7 = -27.61$
$R_8 = -19.95$
$R_9 = +81.96$
$R_{10} = -26.48$ Thicknesses and Separation $d_1 = 5.48$
$d_2 = 1.91$
$s_1 = 1.45$
$d_3 = 3.47$
$b_1 = b_2 = 2.32$
$d_4 = 3.47$
$s_2 = 1.45$
$d_5 = 3.13$
$d_6 = 5.92$ Types of Glass $I = VI$  $N_d$ 1.61071  $N_g$ 1.62501
$II = V$  $N_d$ 1.55065  $N_g$ 1.56616
$III = IV$ $N_d$ 1.51776 $N_g$ 1.52839

Focal length 100 units

J. W. Hasselkus and
G. A. Richmond
INVENTOR

By: Marks & Clerk
Attys.

Patented Sept. 30, 1930

1,777,262

UNITED STATES PATENT OFFICE

JOHN WILLIAM HASSELKUS AND GEORGE ARTHUR RICHMOND, OF LONDON, ENGLAND

OBJECTIVE SUITABLE FOR PHOTOGRAPHIC PURPOSES

Application filed June 28, 1928, Serial No. 288,936, and in Great Britain September 7, 1927.

The invention relates to objectives suitable for photographic purposes and has for its object to provide such an objective having a wide-angle field with an exceptionally large aperture.

With such an object, the present invention consists in objectives having the characteristics hereinafter described and particularly pointed out in the claims.

The accompanying figure shows one form of the invention as a diagrammatic section.

In carrying the invention into effect according to the form shown, the objective consists of six individual lenses, I, II, III, IV, V and VI, arranged three on each side of the diaphragm, A. The combinations on the two sides of the diaphragm each comprise a positive meniscus lens, III or IV, and a doublet formed respectively of a double-convex lens, I or VI, and a double-concave lens, II or V. In each combination the double-concave lens, II or V, lies towards the diaphragm and is cemented or otherwise secured to the double-convex lens, I or VI, the power of the cemented surface being collective, while each meniscus lens is disposed adjacent to the relative double-concave lens with its concave surface towards the diaphragm.

The refractive indices of the various elements of the combinations, commencing with the lenses nearer the diaphragm are in ascending order, while in order to overcome comatic defects the front doublet, I, II, is of greater negative power than the back doublet, V, VI, while the front meniscus, III, is of greater positive power than the back meniscus, IV.

By this unsymmetrical disposition of the powers, two dissimilar combinations are obtained of an approximately equal focal length.

The following tables give particulars of one specific form of objective having a focal length of 100 units, the radii of the surfaces, thicknesses and separation of the component lenses being denoted in the tables by the corresponding reference letters in the figure, while the types of glass for the different lenses are characterized by the refractive indices, $N_d$ and $N_g$ for the helium and mercury lines respectively.

| Radii of surfaces | Thicknesses and separations |
|---|---|
| $R_1 = +22.66$ | $d_1 = 5.48$ |
| $R_2 = -95.51$ | $d_2 = 1.91$ |
| $R_3 = +16.73$ | $s_1 = 1.45$ |
| $R_4 = +24.25$ | $d_3 = 3.47$ |
| $R_5 = +37.77$ | $b_1 = b_2 = 2.32$ |
| $R_6 = -43.64$ | $d_4 = 3.47$ |
| $R_7 = -27.61$ | $s_2 = 1.45$ |
| $R_8 = -19.95$ | $d_5 = 3.13$ |
| $R_9 = +81.96$ | $d_6 = 5.92$ |
| $R_{10} = -26.48$ | |

Types of glass

I = VI   $N_d$ 1.61071   $N_g$ 1.62501
II = V   $N_d$ 1.55065   $N_g$ 1.56616
III = IV $N_d$ 1.51776   $N_g$ 1.52839

An objective as described may have a field of view of 70° with the relatively large aperture of F:4, while producing an astigmatically-corrected field free from spherical, zonal, chromatic and comatic aberrations.

Although a particular combination of lenses has been described by way of illustrating the invention, it will be understood that the scope of the latter is wide enough to include similar combinations of optically equivalent lenses.

Having now described our invention, what we claim as new and desire to secure by Letters Patent is:—

1. An objective of the kind indicated having front and back combinations each comprising a double-convex lens and a double-concave lens cemented together to form a doublet and a single positive meniscus lens on the diaphragm side of the doublet with its concave surface directed towards the diaphragm and separated from the cemented doublet by an air space, the refractive indices of the component lenses commencing with those nearest the diaphragm being in ascending order, as set forth.

2. An objective of the kind indicated having front and back combinations each comprising a double-convex and a double-concave lens cemented together to form a doublet and a single positive meniscus lens on the diaphragm side of the doublet with its concave surface directed towards the diaphragm and separated from the cemented doublet by an air space, the front doublet being of greater negative power than the back doublet and the front meniscus of greater positive power than the back meniscus, as set forth.

In testimony whereof we have signed our names to this specification.

JOHN WILLIAM HASSELKUS.
GEORGE ARTHUR RICHMOND.